UNITED STATES PATENT OFFICE.

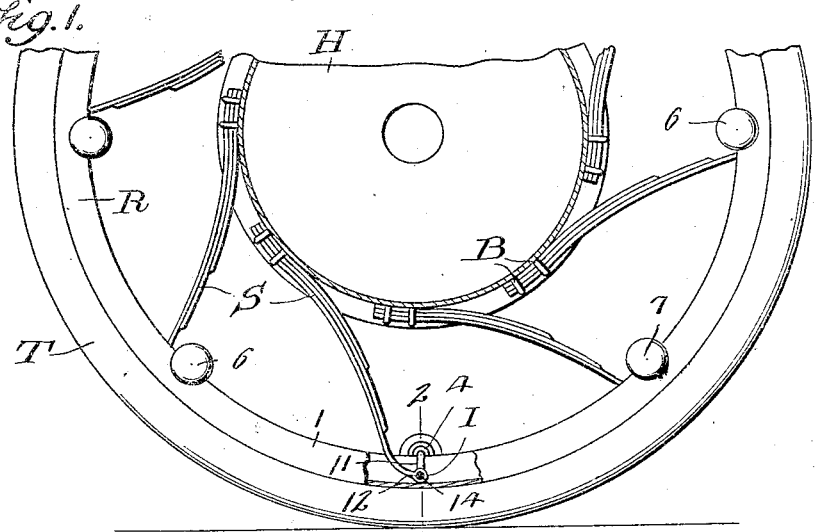
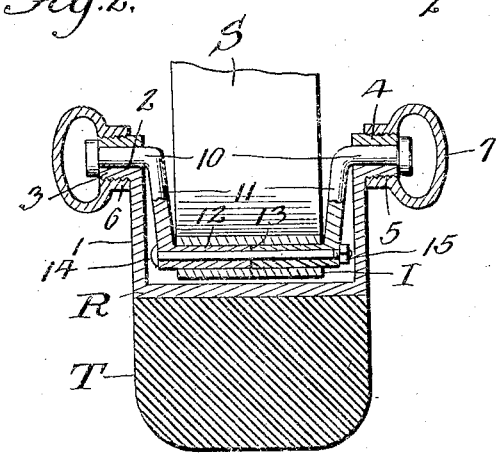
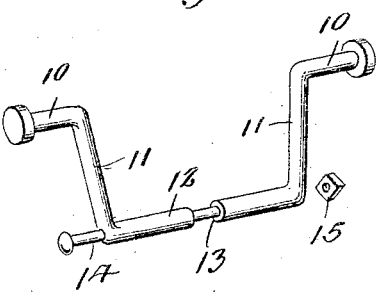
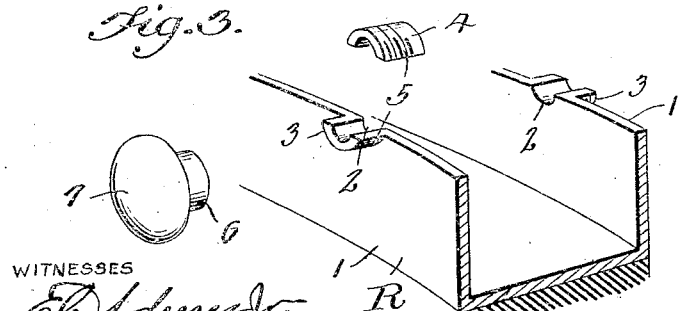

JOSEPH W. GUNTHER, OF STOCKTON, CALIFORNIA.

SPRING-WHEEL.

1,361,984.  Specification of Letters Patent.  Patented Dec. 14, 1920.

Application filed December 29, 1916. Serial No. 139,581.

*To all whom it may concern:*

Be it known that I, JOSEPH W. GUNTHER, a citizen of the United States, residing at Stockton, in the county of San Joaquin and State of California, have invented new and useful Improvements in Spring-Wheels, of which the following is a specification.

This inventon relates to resilient tires and wheels, and more especially to spring wheels having curved spring spokes; and the object of the same is to connect the spokes at both ends in a practical manner which will fasten them rigidly to the hub and movably to the rim, the latter connection being by means of a swinging hanger of peculiar construction.

Details will be found in the following specification and are shown in the accompanying drawings wherein:—

Figure 1 is a side elevation of a portion of this wheel, partly in section.

Fig. 2 is an enlarged transverse section on the line 2—2 of Fig. 1.

Fig. 3 is a detail of the parts of the bearing at one end of the hanger, slightly separated.

Fig. 4 is a detail of the parts of the crank slightly separated.

The principal parts of this wheel are its hub H, rim R, spring spokes S connecting them, and some kind of tire T surrounding the rim; and no claim is laid on the construction of these elements. The spokes are by preference springs standing tangential to the hub and secured at their inner ends to its periphery in any suitable manner as by screws or bolts B, the periphery of the hub preferably being channeled to receive said ends. The springs themselves may be of the leaf type, the shorter leaves toward their inner ends and the longer and longest leaves projecting outward toward the rim, the outermost extremity of the longest leaf having an eye I which embraces the crank in a manner yet to be described.

Coming now to the details of the present invention, the rim R is preferably channeled as shown, and the tire T surrounds the web of the channel. The sides of the channel constitute inwardly extending flanges 1, and at suitable intervals around the wheel these flanges have semi-circular notches 2 around which on the outer side of the flanges are half bearings 3 either secured to or cast with the flanges and projecting outwardly therefrom. Complementary inner half bearings 4 are provided, each by preference a little longer than its mate 3 so that it will pass over the edge of the flange 1 and lie flush with its inner face as best seen in Fig. 2. These half bearings are threaded on their rounded outer sides as at 5, and a cupped nut 6 may be run into place and engaged with said threads to hold the halves together so as to form one complete bearing. The head 7 of the nut forms a chamber for grease or oil.

The crank of the hanger is best shown in Fig. 4. It is substantially of U-shape with outturned journals 10 at its ends, headed at their extremities, side arms 11 integral with the journals, and a cylindrical body 12 between said arms and which in the assembly of parts is intended to pass through the eye I in the outer end of the spring S. This body is divided or split, preferably at its midlength as seen at 13 in Fig. 4, and the two parts of the body are connected in any suitable manner as by a through bolt 14 having a small nut 15 on one end.

In assembling the parts of this hanger, the parts of the body 12 of a crank are passed into opposite ends of the eye I of a spring, and are connected by the bolt 14 and its nut 15. The inner end of the spring is then attached at B to the hub H, or it may be that this attachment may be left until later. The journals 10 of the crank are laid into a pair of transversely alined half bearings 3, their complementary halves 4 are brought down upon them, and the cupped nuts 6 are brought up endwise and screwed on to the threads 5 of the assembled half-bearings to hold them together and to hold all parts on the flange 1 of the rim. The spring S is now under tension, or if its inner end is connected last at B with the hub, the act of so connecting it puts the spring under tension; and the result is that all springs around the hub are under some tension at the time when the parts stand in their normal position as seen in Fig. 1. When weight is thrown on to the wheel as by downward pressure on the hub, the inner end B of each spring moves relatively downward with respect to the tire T and rim R at the bottom of the wheel, and as the spring cannot increase or decrease in its length, the result is that it pushes circumferentially on the hanger and the crank is swung a little in its bearings. The eye of the spring pushes on the body 12 of the crank, and the journals 10 of the latter rock in the bearings in a manner which will be clear. This movement is increased at the bottom when the wheel travels over an obstruction or when an extra load is thrown on to the tire, and obviously the opposite movement of the hanger takes place at the top of the wheel at the same time. I have found a hanger of this type very convenient for assembling the parts, keeping them constantly oiled to prevent wear and to exclude dirt from the bearings, and separating the parts as for cleaning or repair; and I do not wish to be limited as to details further than as called for in the appended claims.

What is claimed as new is:

1. The combination with a channeled member whose flanges have in their edges opposite notches at intervals, half-bearings secured to the outer face of the flanges with their openings in line with said notches, other half-bearings removably mounted on the first-named half-bearings with their openings complementing those therein and the notches, and means for holding the two halves of each bearing assembled; of a hanger having opposed journals mounted in opposite bearings.

2. The combination with a channeled member whose flanges have in their edges opposite notches at intervals, half-bearings secured to one face of the flanges with their openings in line with said notches, other half-bearings removably mounted on the first-named half-bearings with their openings complementing those therein and the notches, the outer sides of the half-bearings being semi-cylindrical and provided with a thread, and a nut engaging the threads of the composite bearing and closing the outer end thereof; of a hanger having opposed journals mounted in opposite bearings.

3. The combination with a channeled member whose flanges have in their edges opposite notches at intervals, half-bearings secured to the flanges with their openings in line with said notches, other half-bearings removably mounted on the first-named half-bearings with their openings complementing those therein, the outer sides of the half-bearings being semi-cylindrical and provided with a thread, and a nut engaging the threads of the composite bearing and closing the outer end thereof; of a crank having out-turned journals on its arms mounted in said bearings and heads at the extremities of said journals.

4. In a spring wheel, a hub, leaf springs secured to said hub at their inner ends, a tire-carrying rim, bearings on said rim, connecting elements journaled in said bearings to which elements the outer ends of said springs are connected, said bearings being formed of two semi-cylindrical sections, and cup nuts screwing on said sections.

5. In a spring wheel, a hub, leaf springs secured to said hub at their inner ends, a tire carrying rim, bearings formed in two semi-cylindrical sections, one section being integral with said rim, cranks formed with journals headed at their ends and resting in bearings on opposite sides of said rim, the heads on said journals engaging the outer end of said bearings, both sections of said bearings being externally threaded, units screwing on said bearings, and means for connecting the outer end of said springs to said cranks.

In testimony whereof I affix my signature.

JOSEPH W. GUNTHER.